(12) United States Patent
Wood

(10) Patent No.: US 8,047,469 B2
(45) Date of Patent: Nov. 1, 2011

(54) AIRFRAME ATTACHMENT FITTING

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 786 days.

(21) Appl. No.: 12/040,878

(22) Filed: Mar. 1, 2008

(65) Prior Publication Data

US 2009/0218445 A1 Sep. 3, 2009

(51) Int. Cl.
*B64C 1/06* (2006.01)

(52) U.S. Cl. .................. 244/131; 244/119; 244/129.1

(58) Field of Classification Search .................. 244/119, 244/131, 129.1, 1 R; 403/79; 16/382, 383, 16/384
See application file for complete search history.

(56) References Cited

U.S. PATENT DOCUMENTS

| 1,768,810 | A | * | 7/1930 | Walton | 16/340 |
| 3,423,786 | A | * | 1/1969 | Arias, Jr et al. | 16/257 |
| 4,039,163 | A | * | 8/1977 | Shorey | 244/137.1 |
| 4,799,631 | A | * | 1/1989 | Humphries et al. | 244/118.5 |
| 5,580,180 | A | * | 12/1996 | DeBisschop et al. | 403/157 |
| 5,927,647 | A | * | 7/1999 | Masters et al. | 244/110 B |
| 6,560,821 | B2 | * | 5/2003 | Miller et al. | 16/252 |
| 6,601,796 | B2 | * | 8/2003 | Roszak | 244/54 |
| 7,000,290 | B1 | * | 2/2006 | Ace | 16/386 |
| 7,191,982 | B2 | * | 3/2007 | Vetillard et al. | 244/119 |
| 2009/0160199 | A1 | * | 6/2009 | Ramsauer | 292/256 |

OTHER PUBLICATIONS http://www.milwaukeecylinder.com/accessories/accessories.asp.*
PCT/US 2009/034221, International Search Report, Feb. 16, 2009.

* cited by examiner

*Primary Examiner* — Tien Dinh
*Assistant Examiner* — Justin Benedik
(74) *Attorney, Agent, or Firm* — Tung & Associates

(57) ABSTRACT

An airframe attachment fitting includes a fitting base having a base attachment surface and a flange attachment surface, at least one attachment post extending from the base attachment surface of the fitting base and at least one attachment flange carried by the flange attachment surface of the fitting base. An aircraft fuselage and a method of attaching a system or subsystem component to an airframe are also disclosed.

20 Claims, 5 Drawing Sheets

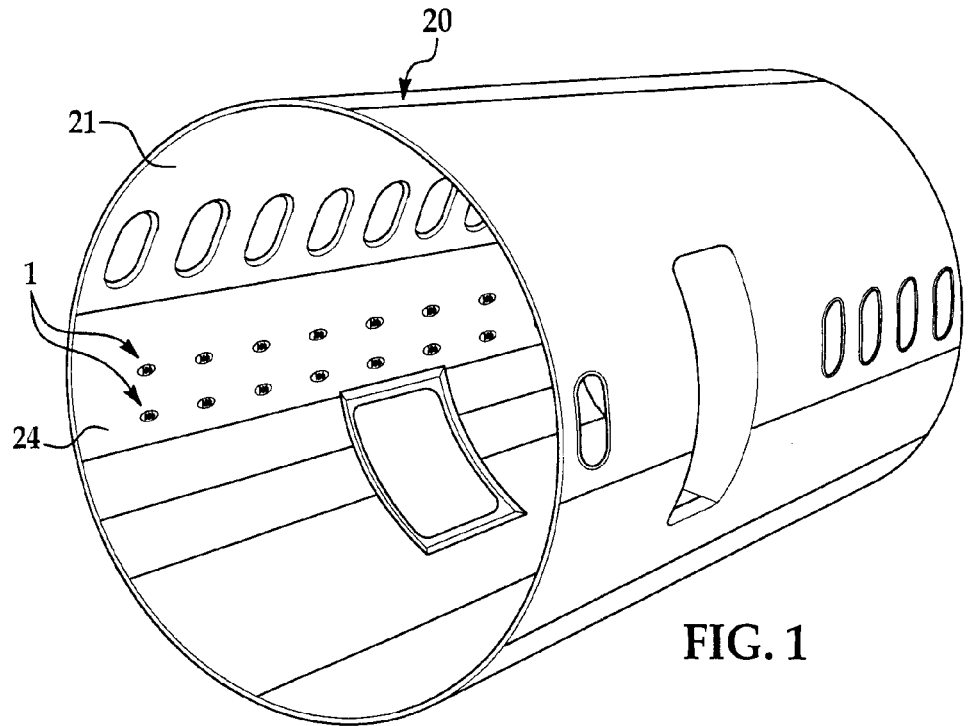
FIG. 1
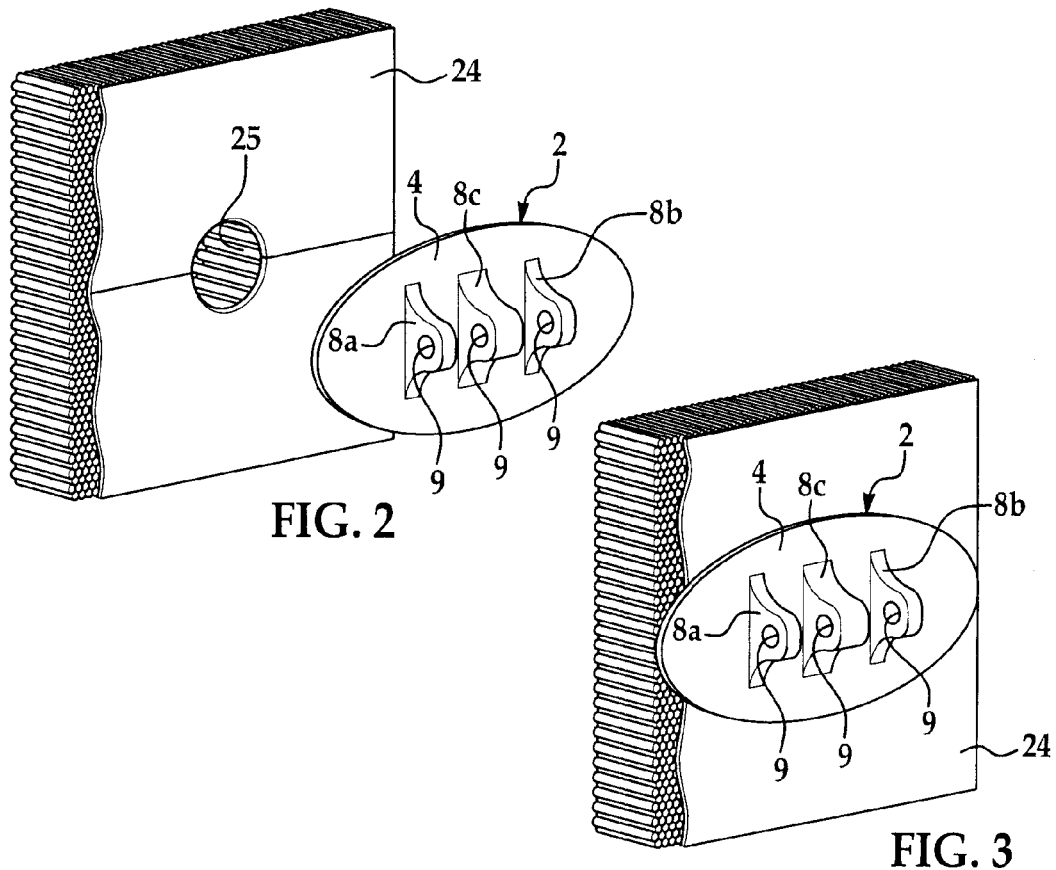
FIG. 2
FIG. 3

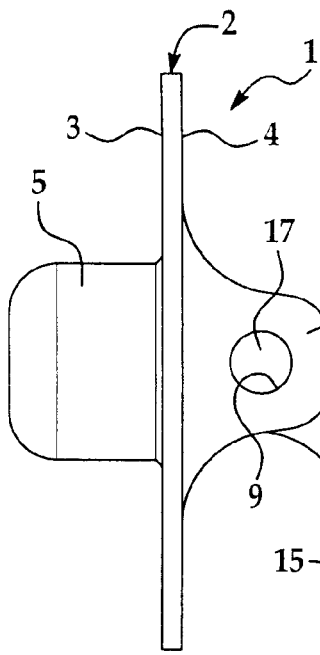

FIG. 10

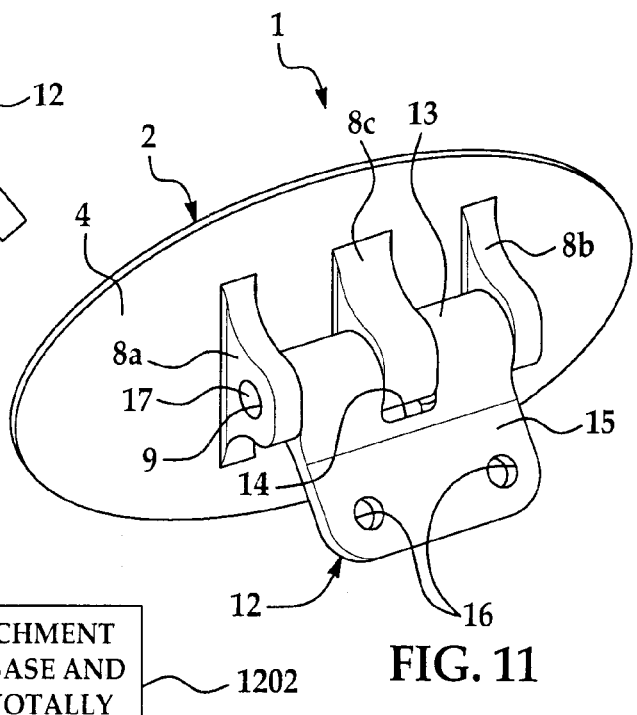

FIG. 11

```
                    1200
                     ↓
        ┌─────────────────────────────────┐
        │  PROVIDE AIRFRAME ATTACHMENT    │
        │  FITTING HAVING FITTING BASE AND│──1202
        │  ATTACHMENT FLANGE PIVOTALLY    │
        │  ATTACHED TO FITTING BASE       │
        └─────────────────────────────────┘
                     ↓
        ┌─────────────────────────────────┐
        │   PROVIDE AIRCRAFT FUSELAGE     │──1204
        └─────────────────────────────────┘
                     ↓
        ┌─────────────────────────────────┐
        │    ATTACH FITTING BASE TO       │──1206
        │     AIRCRAFT FUSELAGE           │
        └─────────────────────────────────┘
                     ↓
        ┌─────────────────────────────────┐
        │  PROVIDE SYSTEM OR SUBSYSTEM    │──1208
        │         COMPONENT               │
        └─────────────────────────────────┘
                     ↓
        ┌─────────────────────────────────┐
        │   ATTACHMENT SUBSYSTEM OR       │
        │  SUBSYSTEM COMPONENT TO         │──1210
        │   ATTACHMENT FLANGE             │
        └─────────────────────────────────┘
```

FIG. 12

AIRFRAME ATTACHMENT FITTING

TECHNICAL FIELD

The disclosure relates to devices for mounting system and subsystem components to an airframe. More particularly, the disclosure relates to an airframe attachment fitting which is suitable for attachment to a composite honeycomb-sandwiched structure such as an aircraft fuselage to facilitate mounting of system and subsystem components to the fuselage.

BACKGROUND

Components of systems and subsystems may be attached to structural members in a wide variety of settings such as aircraft, for example and without limitation. As an example, commercial aircraft structures are historically comprised of thin-skinned shells of aluminum stiffened by longitudinal stringers or longerons that are supported by transverse hoop frames to form a semi-monocoque structure. This conventional structure may enable the integration of system and subsystem components such as ventilation ducting, electrical routing, luggage stowage compartments, flight deck overhead instrument panels and the like. In such applications, simple aluminum brackets can be sized and shaped to suit an application and can be installed onto longerons or hoop frames using basic fasteners such as rivets or bolts. System and subsystem components such as stowage compartments and the like may be suspended from multiple tie rods attached to the brackets that are mounted on the longerons or hoop frames.

Many newer commercial aircraft are departing from the conventional semi-monocoque aluminum fuselage structures in favor of composite monocoque structures using honeycomb-sandwiched skin panels. These honeycomb sandwich skin structures may offer many weight, strength and fatigue-resistant benefits. The honeycomb sandwich skin structures may also present an internal smooth surface of the fuselage body because there may no longer be any exposed stringers, longerons or hoop frames. Because of this absence of exposed longerons or hoop frames, clips and/or brackets may not be attachable to locations as desired to integrate systems and subsystems. Therefore, new airframe attachment mechanisms are desirable for integration of systems and subsystems with honeycomb fuselage structures.

SUMMARY

The disclosure is generally directed to an airframe attachment fitting. An illustrative embodiment of the airframe attachment fitting includes a fitting base having a base attachment surface and a flange attachment surface, at least one attachment post extending from the base attachment surface of the fitting base and at least one attachment flange carried by the flange attachment surface of the fitting base.

The disclosure is further generally directed to an aircraft fuselage. An illustrative embodiment of the aircraft fuselage includes a fuselage barrel and a plurality of airframe attachment fittings carried by the fuselage barrel. Each of the airframe attachment fittings may include a fitting base having a base attachment surface carried by the fuselage barrel, a flange attachment surface opposite the base attachment surface and at least one attachment flange carried by the flange attachment surface.

The disclosure is further generally directed to a method of attaching system and subsystem components to an airframe. An illustrative embodiment of the method includes providing an airframe attachment fitting comprising a fitting base and an attachment flange pivotally carried by the fitting base, providing an aircraft fuselage, attaching the fitting base to the aircraft fuselage, providing a subsystem or subsystem component and attaching the subsystem or subsystem component to the attachment flange of the airframe attachment fitting.

BRIEF DESCRIPTION OF THE ILLUSTRATIONS

FIG. 1 is a perspective view, partially in section, of an aircraft fuselage, with multiple airframe attachment fittings installed in a fuselage barrel of the fuselage.

FIG. 2 is an exploded perspective view of a fitting base of an illustrative embodiment of the airframe attachment fitting, more particularly illustrating an exemplary technique for attaching the fitting base to a honeycomb sandwich structure composite face sheet.

FIG. 3 is a perspective view of a fitting base of an illustrative embodiment of the airframe attachment fitting, attached to a honeycomb sandwich structure composite face sheet.

FIG. 10 is a front perspective view of an illustrative embodiment of the airframe attachment fitting.

FIG. 11 is a left side view of an illustrative embodiment of the airframe attachment fitting.

FIG. 12 is a flow diagram illustrating an illustrative method of attaching a subsystem or subsystem component to an airframe.

DETAILED DESCRIPTION

Figure 4:
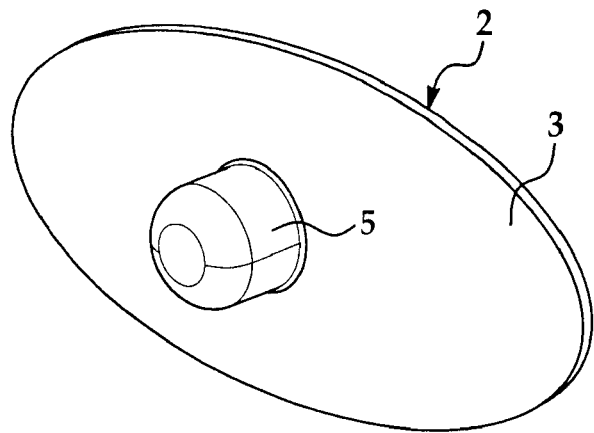
FIG. 4 is a rear perspective view of a fitting base of an illustrative embodiment of the airframe attachment fitting.
Figure 5:
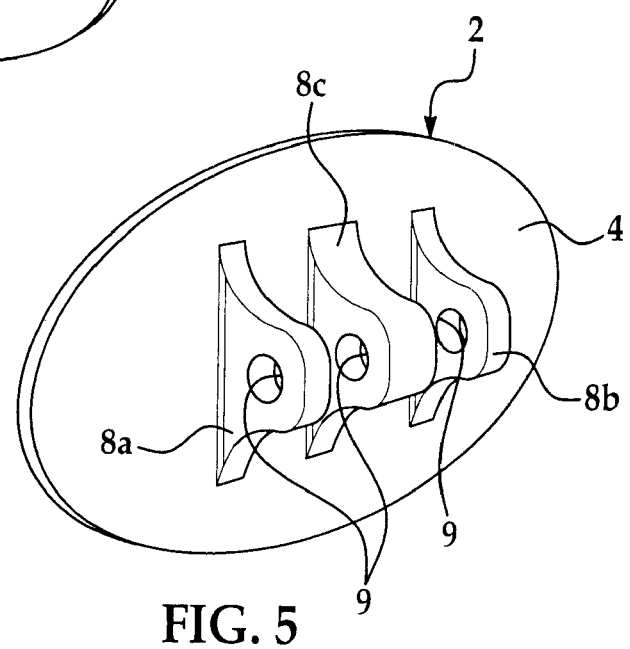
FIG. 5 is a front perspective view of a fitting base of an illustrative embodiment of the airframe attachment fitting.

Referring to the drawings, an illustrative embodiment of the airframe attachment fitting, hereinafter fitting, is generally indicated by reference numeral 1. As shown in FIG. 1 and will be hereinafter described, in one suitable application, multiple airframe attachment fittings 1 are adapted for attachment to the interior of a fuselage barrel 21 of an aircraft fuselage 20. The fittings 1 may facilitate the attachment and integration of components of systems and subsystems (not shown) such as ventilation ducting, electrical routing, luggage stowage compartments, flight deck overhead instrument panels and the like to the aircraft fuselage 20. The fittings 1 may be particularly adaptable to attachment to a fuselage barrel 21 which may be constructed of honeycomb-sandwiched composite skin panels. Such a composite honeycomb panel-constructed fuselage barrel 21 does not require such stiffening structures (not shown) as longitudinal stringers, longerons and hoop frames which may otherwise provide attachment points for brackets to support the subsystems. However, it will be appreciated by those skilled in the art that the airframe attachment fitting 1 may be applicable to attachment of systems and subsystems to structural members in any of a variety of settings.

Figure 7:
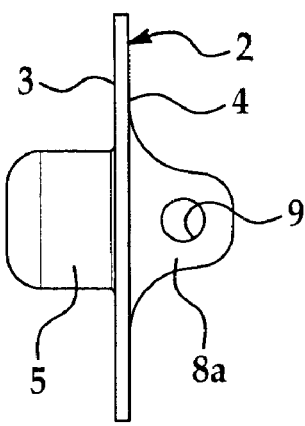
FIG. 7 is a left side view of the fitting base.
Figure 8:
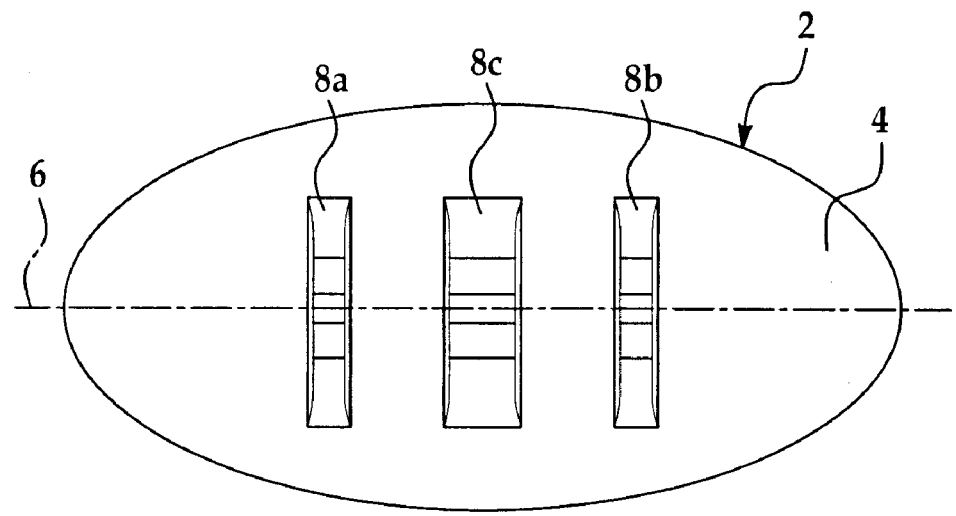
FIG. 8 is a front view of the fitting base.
Figure 9:
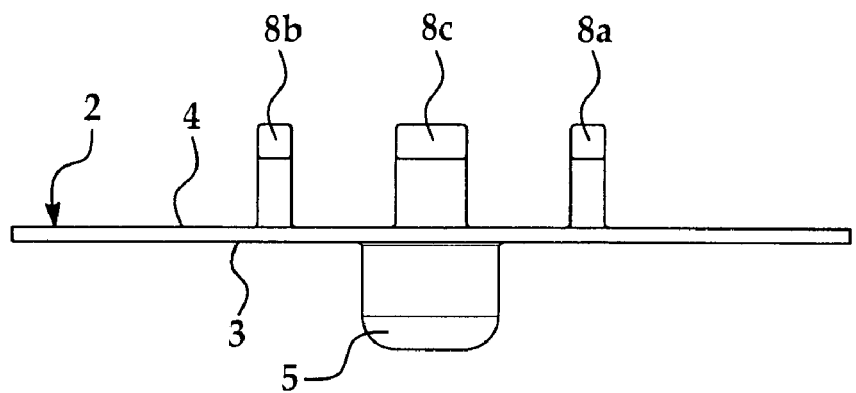
FIG. 9 is a bottom view of the fitting base.

The fitting 1 may be titanium or any suitable alternative metal or material. As shown in FIGS. 4, 5 and 7-9, each fitting 1 may include a fitting base 2. The fitting base 2 may be adapted for attachment to the fuselage barrel 21 (FIG. 1) of the aircraft fuselage 20 as will be hereinafter described. The fitting base 2 may have a generally elongated, elliptical configuration and may have a base attachment surface 3 and a flange attachment surface 4. As shown in FIGS. 4, 7 and 9, in some embodiments an attachment post 5 may extend from the base attachment surface 3 of the fitting base 2 to facilitate attachment of the fitting base 2 to the fuselage barrel 21 of the aircraft fuselage 20 in a manner which will be hereinafter described.

Figure 6:
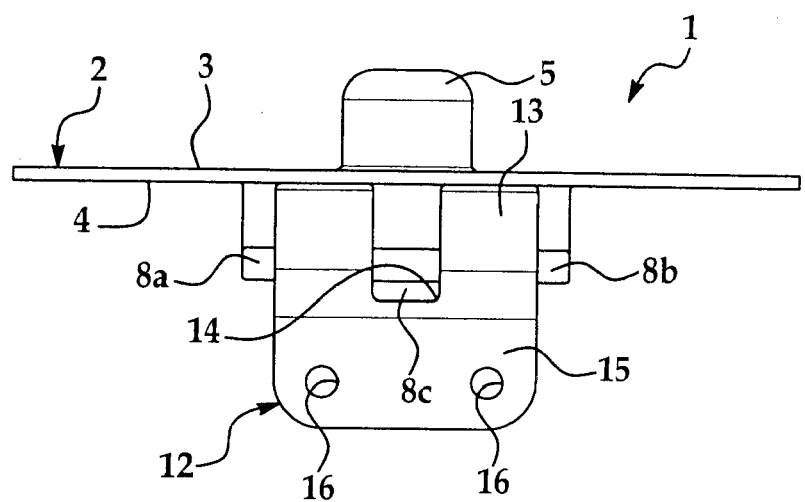
FIG. 6 is a top view of an illustrative embodiment of the airframe attachment fitting.

As shown in FIGS. 6, 10 and 11, at least one attachment flange 12 may include an attachment flange base 13 which is pivotally attached to the flange attachment surface 4 of the fitting base 2. A flange body 15 may extend from the attachment flange base 13. A pair of spaced-apart fastener openings 16 may extend through the flange body 15 for purposes which will be hereinafter described.

The attachment flange base 13 of the attachment flange 12 may be pivotally attached to the fitting base 2 according to any suitable technique which is known to those skilled in the art. In some embodiments, the attachment flange base 13 of the attachment flange 12 may be pivotally attached to multiple, spaced-apart clevis pin bearings 8 which may extend from the flange attachment surface 4 of the fitting base 2. In some embodiments, the clevis pin bearings 8 may include a pair of outside clevis pin bearings 8a, 8b and a middle clevis pin bearing 8c disposed between the outside clevis pin bearings 8a, 8b. A clevis pin 17 (FIG. 10) may be extended through aligned pin openings 9 provided in the respective clevis pin bearings 8 and through a registering pin opening (not shown) which extends through the attachment flange base 13 of the attachment flange 12. A flange base notch 14 may be provided in the attachment flange base 13 of the attachment flange 12 to accommodate the middle clevis pin bearing 8c of the fitting base 2.

As shown in FIGS. 1-3, in one illustrative application, multiple fittings 1 are attached to the interior surface of a fuselage barrel 21 of an aircraft fuselage 20. The fittings 1 may facilitate the attachment and integration of systems and subsystems (not shown) such as ventilation ducting, electrical routing, luggage stowage compartments, flight deck overhead instrument panels and the like to the aircraft fuselage 20. The fuselage barrel 21 may be constructed of honeycomb-sandwiched skin panels (not shown), as is known to those skilled in the art.

In some applications, a honeycomb sandwich structure composite face sheet 24 may be applied to the interior surface of the fuselage barrel 21. The fittings 1 may be attached to the honeycomb sandwich structure composite face sheet 24. The honeycomb sandwich structure composite face sheet 24 may be attached to the honeycomb sandwich fuselage barrel 21 using an adhesive (not shown), or other suitable attachment technique known to those skilled in the art. In one suitable attachment method, the fitting base 2 of each fitting 1 is attached to the honeycomb sandwich structure composite face sheet 24 by providing an attachment post opening 25 in the honeycomb sandwich structure composite face sheet 24. The attachment post 5 (FIG. 4) which extends from the base attachment surface 3 of the fitting base 2 may be inserted in the attachment post opening 25. The attachment post 5 and the base attachment surface 3 of the fitting base 2 may be attached to the honeycomb sandwich structure composite face sheet 24 using fasteners (not shown), an adhesive (not shown) and/or any suitable alternative technique which is known to those skilled in the art.

The components of various systems and subsystems (not shown) such as ventilation ducting, electrical routing, luggage stowage compartments, flight deck overhead instrument panels and the like can be attached to the flange body 15 on the attachment flange 12 of each fitting 1. As shown in FIG. 8, the attachment pin load axis 6 of the fitting base 2 may be oriented on the honeycomb sandwich structure composite face sheet 24 in generally parallel relationship with respect to the load path which is to be applied by the system and subsystem component attachments (not shown) such that the load path is distributed into the honeycomb sandwich structure composite face sheet 24 over the relatively large area corresponding to the typically elliptical shape of the fitting base 2. Because the attachment flange 12 may be capable of pivoting with respect to the fitting base 2, non-perfect alignment of a system or subsystem component attach device (not shown), which attaches the component to the attachment flange 12, in relation to the fitting base 2 can be achieved. This may enhance the bearing capability of the fuselage barrel 21 of the aircraft fuselage 20.

Referring next to FIG. 12, a flow diagram 1200 which illustrates an illustrative method of attaching a system or subsystem component to an airframe is shown. In block 1202, an airframe attachment fitting having a fitting base and an attachment flange pivotally attached to the fitting base is provided. In block 1204, an aircraft fuselage is provided. In block 1206, the fitting base of the airframe attachment fitting is attached to the aircraft fuselage. In block 1208, a system or subsystem component is provided. In block 1210, the subsystem or subsystem component is attached to the attachment flange of the airframe attachment fitting.

Figure 13:
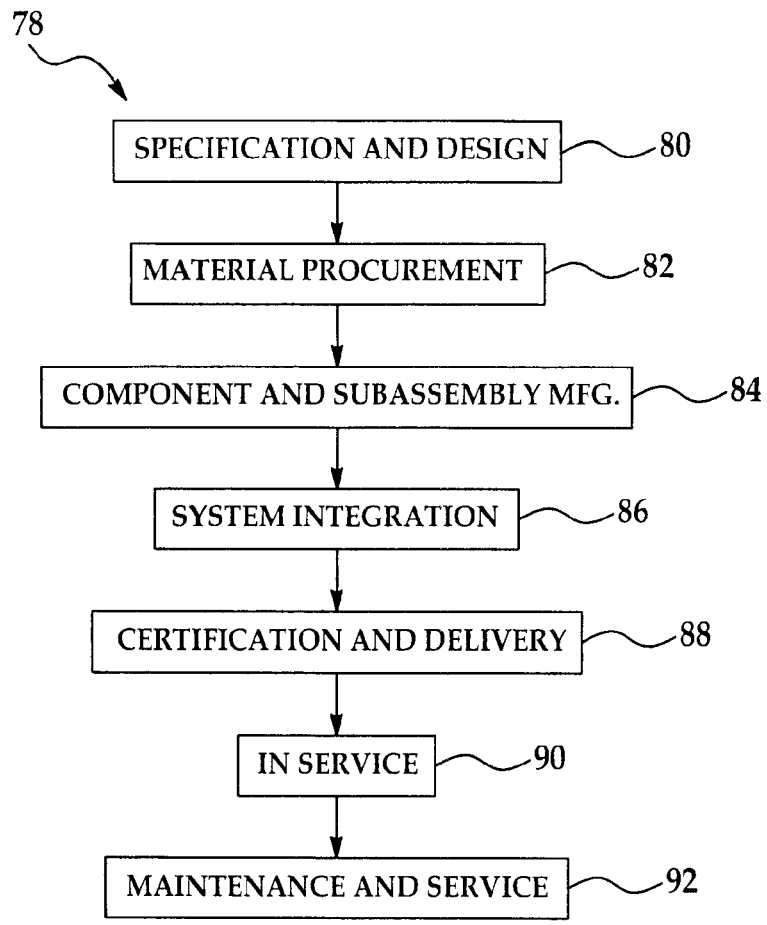
FIG. 13 is a flow diagram of an aircraft production and service methodology.
Figure 14:
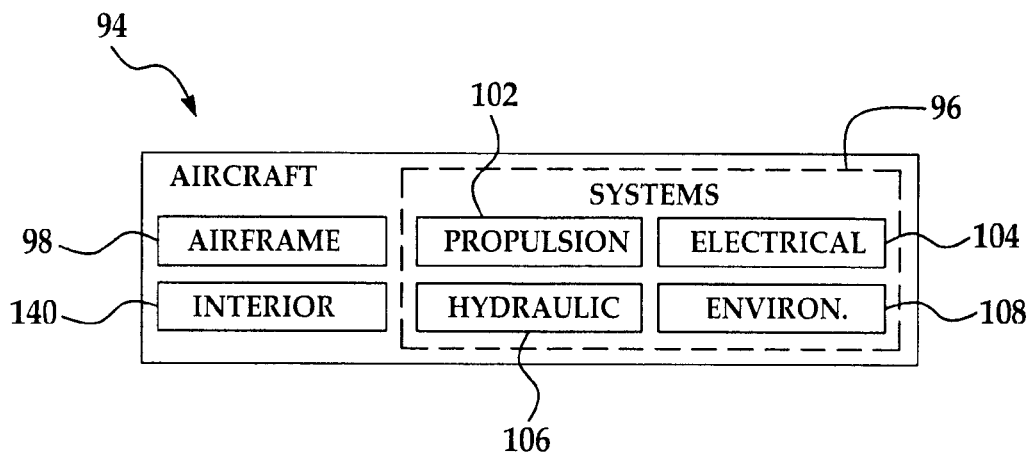
FIG. 14 is a block diagram of an aircraft.

Referring next to FIGS. 13 and 14, embodiments of the disclosure may be used in the context of an aircraft manufacturing and service method 78 as shown in FIG. 13 and an aircraft 94 as shown in FIG. 14. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 94 produced by exemplary method 78 may include an airframe 98 with a plurality of systems 96 and an interior 1 40. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An airframe attachment fitting, comprising:
   a fitting base of at least partially an arcuate shape having a base attachment surface and a flange attachment surface;
   not more than one attachment post permanently attached to and geometrically centered on said fitting base, extending from said base attachment surface of said fitting base; and
   at least two attachment flanges extending away and carried by said flange attachment surface of said fitting base.

2. The airframe attachment fitting of claim 1 wherein said fitting base has a generally elongated, elliptical shape.

3. The airframe attachment fitting of claim 1 wherein said at least two attachment flanges each comprises an attachment flange base carried by said flange attachment surface of said fitting base and a flange body extending from said attachment flange base.

4. The airframe attachment fitting of claim 3 further comprising at least one fastener opening provided in said flange body of said at least one attachment flange.

5. The airframe attachment fitting of claim 1 further comprising a plurality of clevis pin bearings carried by said flange attachment surface of said fitting base and wherein said attachment flange is carried by said clevis pin bearings.

6. The airframe attachment fitting of claim 5 further comprising a clevis pin extending through said attachment flange and said clevis pin bearings.

7. The airframe attachment fitting of claim 5 wherein said plurality of clevis pin bearings comprises a pair of spaced-apart outside clevis pin bearings and a middle clevis pin bearing disposed between said outside clevis pin bearings.

8. The airframe attachment fitting of claim 7 further comprising a notch provided in said attachment flange and accommodating said middle clevis pin bearing.

9. An aircraft fuselage, comprising:
   a fuselage barrel; and
   a plurality of airframe attachment fittings carried by said fuselage barrel and each comprising:
      a fitting base of at least partially an arcuate shape having a base attachment surface carried by said fuselage barrel and a pivoting flange attachment surface opposite said base attachment surface;
      not more than one attachment post geometrically centered on said fitting base permanently attached to and extending from said base attachment surface of said fitting base; and
         at least two attachment flanges extending away and carried by said flange attachment surface.

10. The aircraft fuselage of claim 9 further comprising a honeycomb sandwich structure composite face sheet carried by said fuselage barrel and wherein said base attachment surface of said fitting base is carried by said honeycomb sandwich structure composite face sheet.

11. The aircraft fuselage of claim 10 further comprising not more than one attachment post extending from said base attachment surface and at least one attachment post opening provided in said honeycomb sandwich structure composite face sheet and receiving said not more than one attachment post.

12. The aircraft fuselage of claim 9 wherein said fitting base has a generally elongated, elliptical shape.

13. The aircraft fuselage of claim 9 wherein said at least two attachment flanges comprises an attachment flange base carried by said flange attachment surface of said fitting base and a flange body extending from said attachment flange base.

14. The aircraft fuselage of claim 13 further comprising a plurality of clevis pin bearings carried by said flange attachment surface of said fitting base and wherein said attachment flange base of said at least one attachment flange is carried by said clevis pin bearings.

15. The aircraft fuselage of claim 14 wherein said plurality of clevis pin bearings comprises a pair of spaced-apart outside clevis pin bearings and a middle clevis pin bearing between said outside clevis pin bearings.

16. The airframe attachment fitting of claim 15 further comprising a notch provided in said attachment flange base of said attachment flange and accommodating said middle clevis pin bearing.

17. The airframe attachment fitting of claim 13 further comprising at least one fastener opening provided in said flange body of said at least two attachment flanges.

18. A method of attaching a system or subsystem component to an airframe, comprising:
   providing an airframe attachment fitting comprising a fitting base and an attachment flange pivotally carried by said fitting base, said fitting base comprising not more than one attachment post geometrically centered on said fitting base permanently attached to and extending from a base attachment surface of said fitting base;
   providing an aircraft fuselage;
   attaching said fitting base to said aircraft fuselage;
   providing a subsystem; and
   attaching said system or subsystem component to said attachment flange of said airframe attachment fitting.

19. The method of claim 18 further comprising providing a honeycomb sandwich structure composite face sheet on said aircraft fuselage and wherein said attaching said fitting base to said aircraft fuselage comprises attaching said fitting base to said honeycomb sandwich structure composite face sheet.

20. The method of claim 19 further comprising an attachment post opening in said honeycomb sandwich structure composite face sheet and wherein said attaching said fitting base to said honeycomb sandwich structure composite face sheet comprises inserting said attachment post into said attachment post opening.

\* \* \* \* \*